(12) United States Patent
Haag et al.

(10) Patent No.: US 12,487,454 B2
(45) Date of Patent: Dec. 2, 2025

(54) WINDSHIELD, DISPLAY SYSTEM, AND REFLECTIVE POLARIZER

(71) Applicant: 3M INNOVATIVE PROPERTIES COMPANY, St. Paul, MN (US)

(72) Inventors: Adam D. Haag, Woodbury, MN (US); Brianna N. Wheeler, Bloomington, MN (US); Matthew B. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 342 days.

(21) Appl. No.: 18/220,917

(22) Filed: Jul. 12, 2023

(65) Prior Publication Data
US 2024/0027757 A1  Jan. 25, 2024

Related U.S. Application Data

(60) Provisional application No. 63/391,043, filed on Jul. 21, 2022.

(51) Int. Cl.
*G02B 27/01* (2006.01)
*G02B 5/30* (2006.01)

(52) U.S. Cl.
CPC ....... *G02B 27/0101* (2013.01); *G02B 5/3025* (2013.01); *G02B 2027/0112* (2013.01)

(58) Field of Classification Search
CPC .............. G02B 27/0101; G02B 5/3025; G02B 2027/0112

USPC .......................................................... 359/630
See application file for complete search history.

(56) References Cited

U.S. PATENT DOCUMENTS

| | | |
|---|---|---|
| 6,952,312 B2 | 10/2005 | Weber et al. |
| 7,123,418 B2 | 10/2006 | Weber et al. |

FOREIGN PATENT DOCUMENTS

| | | | |
|---|---|---|---|
| WO | 2019145860 A1 | 8/2019 | |
| WO | 2020016703 A2 | 1/2020 | |
| WO | 2020068513 A1 | 4/2020 | |
| WO | WO-2022271905 A1 * | 12/2022 | ......... G02B 27/0101 |

* cited by examiner

*Primary Examiner* — William Choi
(74) *Attorney, Agent, or Firm* — Jonathan L. Tolstedt

(57) ABSTRACT

A windshield of a vehicle includes a reflective polarizer. The windshield is configured to receive and reflect an image light emitted by a display toward a passenger of the vehicle, such that for a substantially normally incident light, the windshield has first and second reflection spectra versus wavelength for the incident light polarized along respective first and second directions. The first reflection spectrum includes a plurality of reflection bands. Each of the reflection bands has a maximum reflectance R1max between 20% and 80%. Between each pair of adjacent reflection bands in the plurality of reflection bands, the first reflection spectrum has a minimum reflectance R1min between 5% and 25%. In the visible wavelength range, the second reflection spectrum has a maximum reflectance R2max and a minimum reflectance R2min, such that R2max and R2min are within 15% of each other.

6 Claims, 10 Drawing Sheets

WINDSHIELD, DISPLAY SYSTEM, AND REFLECTIVE POLARIZER

TECHNICAL FIELD

The present disclosure relates generally to a reflective polarizer, and in particular, to a display system and a windshield including the reflective polarizer.

BACKGROUND

Reflective polarizers are optical elements that allow light of one polarization to be substantially transmitted through the reflective polarizer for a wavelength range, while substantially reflecting light of another polarization for the same wavelength range. Reflective polarizers are commonly used in display systems. In some applications of the display systems, such as in a heads up display (HUD), the reflective polarizers are used for reflecting and directing emitted light from a display to passengers of vehicles. The HUDs are used to present information to the passengers without requiring the passengers to look away from the vehicle surroundings that can be viewed through a windshield of the vehicles. The HUDs are now increasingly used as a safety feature for the vehicles, such as automobiles.

SUMMARY

In a first aspect, the present disclosure provides a windshield of a vehicle. The windshield includes a reflective polarizer. The windshield is configured to receive and reflect an image light emitted by a display toward a passenger of the vehicle, such that for a substantially normally incident light, the windshield has first and second reflection spectra versus wavelength for the incident light polarized along respective first and second directions. The first reflection spectrum includes a plurality of substantially distinct and spaced apart reflection bands. No more than two of the reflection bands are disposed in a visible wavelength range extending from about 420 nanometers (nm) to about 680 nm. At least one of the reflection bands is disposed in an infrared wavelength range extending from about 680 nm to about 1300 nm. Each of the reflection bands has a maximum reflectance R1max between about 20% and about 80%. Between each pair of adjacent reflection bands in the plurality of reflection bands, the first reflection spectrum has a minimum reflectance R1min between about 5% and about 25%. In the visible wavelength range, the second reflection spectrum has a maximum reflectance R2max and a minimum reflectance R2min, R2max and R2min are within about 15% of each other.

In a second aspect, the present disclosure provides a display system for displaying a virtual image to a passenger of a vehicle. The display system includes a display configured to emit an image light having substantially distinct blue, green, and red emission bands having respective blue, green, and red full width at half maxima (FWHMs). The display system further includes a reflective polarizer configured to receive the image light at a first incident angle of greater than about 30 degrees and reflect the received image light for viewing by the passenger. For a p-polarized incident light propagating in a first incident plane and incident on the reflective polarizer at the first incident angle, an optical reflectance of the reflective polarizer versus wavelength includes substantially distinct blue, green, and red reflection bands having respective blue, green, and red FWHMs. The reflective polarizer reflects R1% of the incident light for at least one same blue wavelength within the blue FWHMs of the blue emission and reflection bands, at least one same green wavelength within the green FWHMs of the green emission and reflection bands, and at least one same red wavelength within the red FWHMs of the red emission and reflection bands, $10 \leq R1 \leq 70$. The reflective polarizer reflects R2% of the incident light for at least one same first wavelength between the FWHMs of the blue and green reflection bands and between the FWHMs of the blue and green emission bands, and for at least one same second wavelength between the FWHMs of the green and red reflection bands and between the FWHMs of the green and red emission bands, $2 \leq R2 \leq R1/2$. For an s-polarized incident light propagating in the first incident plane and incident on the reflective polarizer at the first incident angle, and for a visible wavelength range extending from about 420 nm to about 680 nm, an optical reflectance of the reflective polarizer versus wavelength has a maximum reflectance Rmax and a minimum reflectance Rmin. Rmax and Rmin are within about 25% of each other.

In a third aspect, the present disclosure provides a display system for displaying a polarized image to a viewer. The display system includes a display including pluralities of blue, green, and red light emitting elements configured to emit respective polarized blue, green, and red image lights within respective blue, green, and red wavelength ranges extending from about 420 nm to about 480 nm, about 490 nm to about 560 nm, and about 590 nm to about 670 nm, respectively. The display system further includes a reflective polarizer configured to receive the emitted polarized blue, green, and red image lights and reflect between about 10% and about 80% of the received image lights toward the viewer. For each of a blue-green wavelength range disposed between blue and green wavelength ranges and a green-red wavelength range disposed between the green and red wavelength ranges, the reflective polarizer has an average optical reflectance of between about 2% and about 20%.

In a fourth aspect, the present disclosure provides a reflective polarizer including a plurality of polymeric layers numbering at least 10 in total. Each of the polymeric layers has an average thickness of less than about 500 nm. For an incident light incident at an incident angle of greater than about 30 degrees and for one of p- and s-polarization states, the reflective polarizer has an optical reflectance R1' for each of a blue wavelength between about 420 nm to about 480 nm, a green wavelength between about 490 nm to about 560 nm, and a red wavelength between about 590 nm to about 670 nm, and a minimum optical reflectance R2' for wavelengths between the blue and green wavelengths and between the green and red wavelengths, $1.1 \leq R1'/R2' \leq 5$. For the other of the p- and s-polarization states, the reflective polarizer has an average optical reflectance of less than about 20% in a visible wavelength range extending from about 420 nm to about 680 nm.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
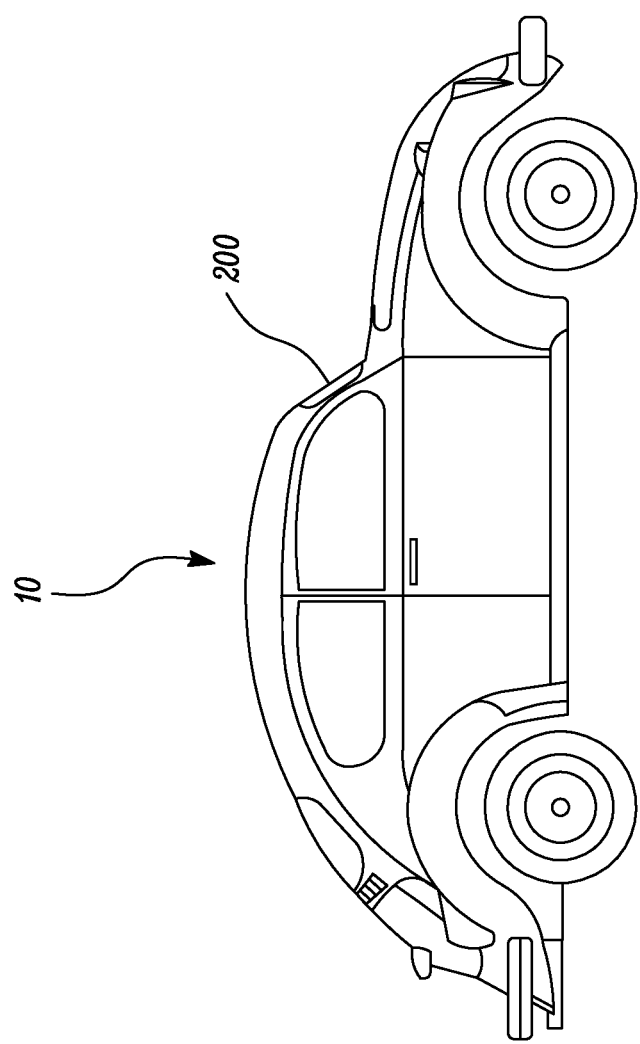
FIG. 1 is a schematic side view of an example of a vehicle having a windshield.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

In some applications, a reflective polarizer is applied to a substantially transparent component, which requires substantial transmission of light in a visible wavelength range. For example, in some applications, such as in heads up displays (HUDs), the reflective polarizer may be applied to a windshield of a vehicle for reflecting and directing emitted light from a display to a passenger of the vehicle. In some cases, the windshields may require a transmission of greater than about 70% of light in the visible wavelength range. Therefore, optical reflectivity of the reflective polarizer should be limited (in both pass and block states) to ensure the transmission of light required by the transparent component. In some cases, conventional notched reflective polarizers are used to ensure the transmission of light required by the transparent components in the block state. The conventional notched reflective polarizers have multiple notches or bands of high optical reflectivity in the block state. This gives rise to a significant variation in the optical reflectivity of the conventional notched reflective polarizers in the block state due to a difference between the high optical reflectivity of the notches and low optical reflectivity between the notches. This may result in severe color shifts for different angles of incidence of light on the conventional notched reflective polarizers.

Therefore, a reflective polarizer may be required which provides a bright reflected image while also maintaining a good transmission for a visible wavelength range.

The present disclosure relates to a windshield of a vehicle including a reflective polarizer, and a display system including a display and the reflective polarizer. The display system may be a HUD. The HUD may be used in various vehicles, such as aircrafts, watercrafts, or landcrafts (including motor vehicles, such as automobiles, trucks, and motorcycles).

The windshield is configured to receive and reflect an image light emitted by a display toward a passenger of the vehicle, such that for a substantially normally incident light, the windshield has first and second reflection spectra versus wavelength for the incident light polarized along respective first and second directions. The first reflection spectrum includes a plurality of substantially distinct and spaced apart reflection bands. No more than two of the reflection bands are disposed in a visible wavelength range extending from about 420 nanometers (nm) to about 680 nm. At least one of the reflection bands is disposed in an infrared wavelength range extending from about 680 nm to about 1300 nm. Each of the reflection bands has a maximum reflectance R1max between about 20% and about 80%. Between each pair of adjacent reflection bands in the plurality of reflection bands, the first reflection spectrum has a minimum reflectance R1min between about 5% and about 25%. In the visible wavelength range, the second reflection spectrum has a maximum reflectance R2max and a minimum reflectance R2min, R2max and the R2min are within about 15% of each other.

Since the reflection bands of the first reflection spectrum have the maximum reflectance R1max between about 20% and about 80%, and the first reflection spectrum has the minimum reflectance R1min between about 5% and about 25% between each pair of the adjacent reflection bands in the plurality of reflection bands, the optical reflectivity of the windshield for the substantially normally incident light polarized along the first direction is lower than that of the conventional notched reflective polarizers. Furthermore, since no more than two of the reflection bands are disposed in the visible wavelength range, the optical reflectivity of the windshield for the substantially normally incident light polarized along the first direction is further reduced in the visible wavelength range. The reduced optical reflectivity of the windshield for the substantially normally incident light polarized along the first direction in the visible wavelength range may ensure the transmission of light in the visible wavelength range required by the windshield of the vehicle.

Further, the reflective polarizer of the present disclosure has an optical reflectance R1' for each of a blue wavelength between about 420 nm to about 480 nm, a green wavelength between about 490 nm to about 560 nm, and a red wavelength between about 590 nm to about 670 nm, for an incident light incident at an incident angle of greater than about 30 degrees and for one of p- and s-polarization states. Further, the reflective polarizer has a minimum optical reflectance R2' for wavelengths between the blue and green wavelengths and between the green and red wavelengths, for the incident light incident at the incident angle and for the one of p- and s-polarization states. A relationship between R1' and R2' is given by: $1.1 \leq R1'/R2' \leq 5$. Further, for the other of the p- and s-polarization states, the reflective polarizer has an average optical reflectance of less than about 20% in a visible wavelength range extending from about 420 nm to about 680 nm.

Since R1'/R2' is less than 5, the reflective polarizer has soft notches (i.e., the notches or reflective bands have a low optical reflectivity variation in the blocked state). As a result, the reflective polarizer of the present disclosure may substantially reduce the color shifts that are otherwise caused when the conventional notched reflective polarizers are used in the display systems.

Referring now to the Figures, FIG. 1 schematically shows a side view of an example vehicle 10 that may implement illustrative embodiments of the present disclosure. The vehicle 10 may include any navigable vehicle that may be operated on a road surface, and includes, without limitation, cars, buses, motorcycles, off-road vehicles, and trucks. In some other embodiments, the vehicle 10 may also include water vehicles and aircrafts. The vehicle 10 includes a windshield 200. The windshield 200 may include any of a wide variety of transparent members, and can be unitary or laminated, flat or curved (simple or compound curvature), water clear or tinted, can have focusing properties, and can be composed of any conventional glasses and/or plastics. In some cases, the windshield 200 may include a sheet of glass or other transparent material with two opposing surfaces.

Figure 2:
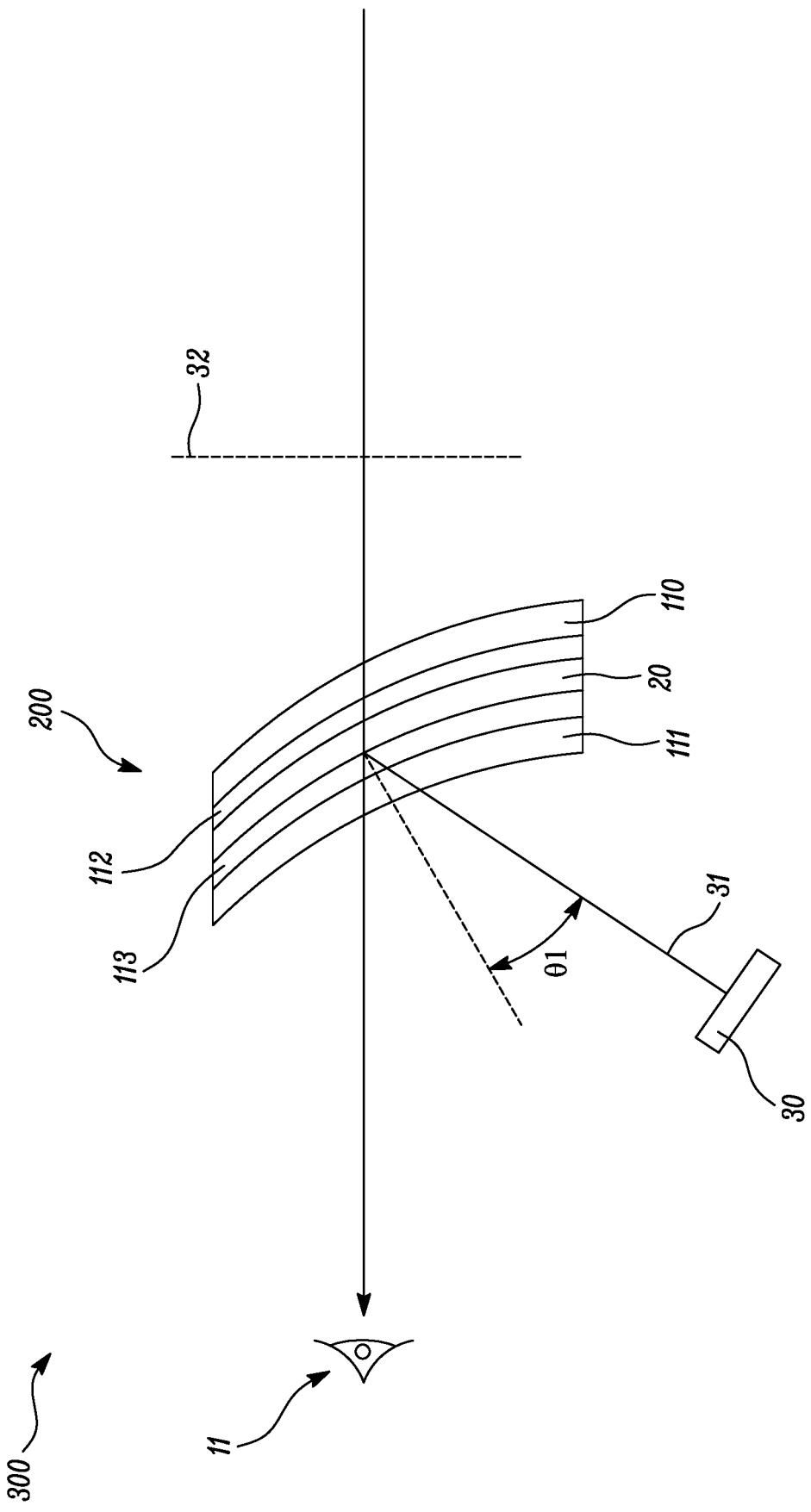
FIG. 2 is a schematic view of a display system for displaying a virtual image to a passenger of the vehicle, according to an embodiment of the present disclosure.

FIG. 2 illustrates a display system 300 for displaying a virtual image 32 to a passenger 11 of the vehicle 10 (shown in FIG. 1) according to an embodiment of the present disclosure. In some embodiments, the display system 300 may be a heads up display (HUD). The display system 300 may display information to the passenger 11 of the vehicle 10. The passenger 11 may be a driver of the vehicle 10. The display system 300 may display the information in the driver's view, so that the driver may not need to look away from the windshield 200 while driving to see the information displayed. The display system 300 of the vehicle 10 as disclosed in the present disclosure may be configured to, and without limitation, display any type of information, such as map related information, navigation instructions, certain type of warning or alerts, automatic driving assistance information, vehicle's speed, fuel level, engine temperature, communication events, and other related information on the windshield 200 of the vehicle 10. The display of such information on the windshield 200 of the vehicle 10 may also be represented without limitation in any form, such as digital gauges, text boxes, animated images, or any other graphical representation. Further, the display system 300 of the vehicle 10 may also present augmented reality graphic elements which augment a physical environment surrounding the vehicle 10 with real-time information.

In some embodiments, the display system 300 may be used in other applications, for example, for displaying a polarized image to a viewer. Therefore, the virtual image 32 may be interchangeably referred to as the polarized image 32 and the passenger 11 may be interchangeably referred to as the viewer 11.

The display system 300 includes a display 30 and a reflective polarizer 20. In some embodiments, at least a portion of the display system 300 is disposed in the windshield 200. For example, in the illustrated embodiment of FIG. 2, the windshield 200 includes the reflective polarizer 20. The display 30 may include various elements, such as an electroluminescent panel, an incandescent or a phosphorescent light source, a cathode ray tube (CRT), light emitting diodes (LEDs), lenses, collimators, reflectors, and/or polarizers. In some embodiments, the display 30 may include an organic light emitting diode (OLED) display panel. In some other embodiments, the display 30 may include a liquid crystal display (LCD) panel. The virtual image 32 can be substantially monochromatic, polychromatic, narrow band, or broad band, but preferably overlaps at least a portion of the visible spectrum. Furthermore, the display 30 may also include a mechanism, such as a tilting mirror or displacement means, to change the angle and/or position of the virtual image 32 so as to accommodate the passenger 11 at different positions or heights.

In some embodiments, the windshield 200 further includes a first glass layer 110 and a second glass layer 111. In some embodiments, the reflective polarizer 20 is disposed between the first glass layer 110 and the second glass layer 111. In some embodiments, the reflective polarizer 20 is bonded to each of the first and second glass layers 110, 111 via a bonding layer 112, 113. Specifically, the reflective polarizer 20 is bonded to the first glass layer 110 via the bonding layer 112 and the reflective polarizer 20 is bonded to the second glass layer 111 via the bonding layer 113.

As illustrated in FIG. 2, the windshield 200 is configured to receive and reflect an image light 31 emitted by the display 30 toward the passenger 11 of the vehicle 10 (shown in FIG. 1). Specifically, the reflective polarizer 20 is configured to receive the image light 31 at a first incident angle θ1 of greater than about 30 degrees and reflect the received image light 31 for viewing by the passenger 11. In some embodiments, the reflective polarizer 20 is configured to receive the image light 31 at the first incident angle θ1 of greater than about 35 degrees, greater than about 40 degrees, greater than about 45 degrees, or greater than about 50 degrees.

Figure 3:
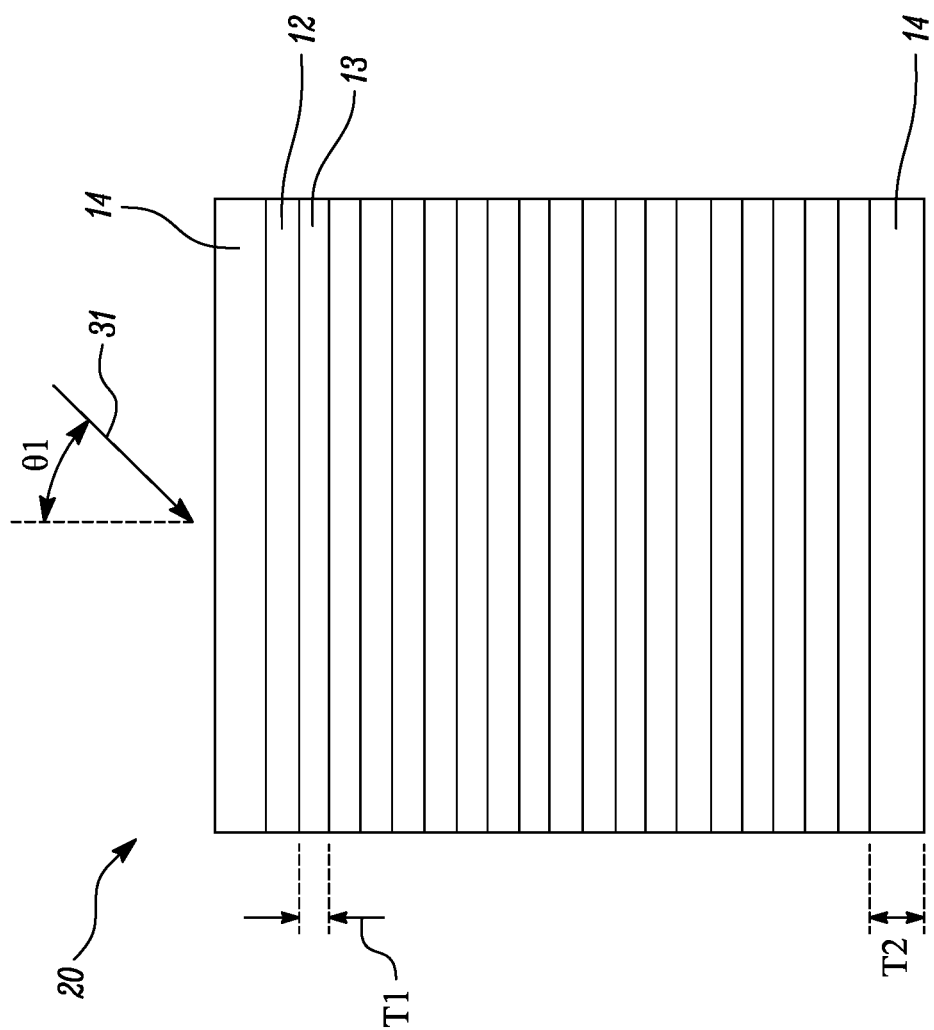
FIG. 3 is a detailed schematic view of a reflective polarizer, according to an embodiment of the present disclosure.

FIG. 3 illustrates a schematic view of the reflective polarizer 20 according to an embodiment of the present disclosure. The reflective polarizer 20 defines mutually orthogonal x, y, and z-axes. The x and y-axes are in-plane axes of the reflective polarizer 20, while the z-axis is a transverse axis disposed along a thickness of the reflective polarizer 20. In other words, the x and y-axes are disposed along a plane of the reflective polarizer 20, while the z-axis is perpendicular to the plane of the reflective polarizer 20.

As shown in FIG. 3, the reflective polarizer 20 includes a plurality of polymeric layers 12, 13 numbering at least 10 in total. In some embodiments, a number of the plurality of polymeric layers 12, 13 may be at least 20, at least 50, at least 75, at least 100, at least 150, at least 200, at least 250, at least 300, or at least 400 in total. In some embodiments, the plurality of polymeric layers 12, 13 are arranged in an alternating manner.

In some embodiments, each of the polymeric layers 12, 13 has an average thickness T1 of less than about 500 nanometers (nm). The term "average thickness", as used herein, refers to an average of thicknesses measured at multiple points across a plane (i.e., the x-y plane) of each of the polymeric layers 12, 13. In some other embodiments, each of the polymeric layers 12, 13 may have the average thickness T1 of less than about 400 nm, less than about 350 nm, less than about 300 nm, less than about 250 nm, or less than about 200 nm.

In some embodiments, the reflective polarizer 20 further includes at least one skin layer 14 having an average thickness T2 of greater than about 500 nm. In the illustrated embodiment of FIG. 3, the reflective polarizer 20 includes two skin layers 14 and the plurality of polymeric layers 12, 13 are disposed therebetween. In some embodiment, the at least one skin layer 14 may have the average thickness T2 of greater than about 750 nm, greater than about 1000 nm, greater than about 1500 nm, or greater than about 2000 nm. The at least one skin layer 14 may act as a protective layer for the plurality of polymeric layers 12, 13. In other words, the at least one skin layer 14 may act as protective boundary layers (PBL).

As discussed above, the reflective polarizer 20 is configured to receive the image light 31 at the first incident angle θ1.

Figure 4:
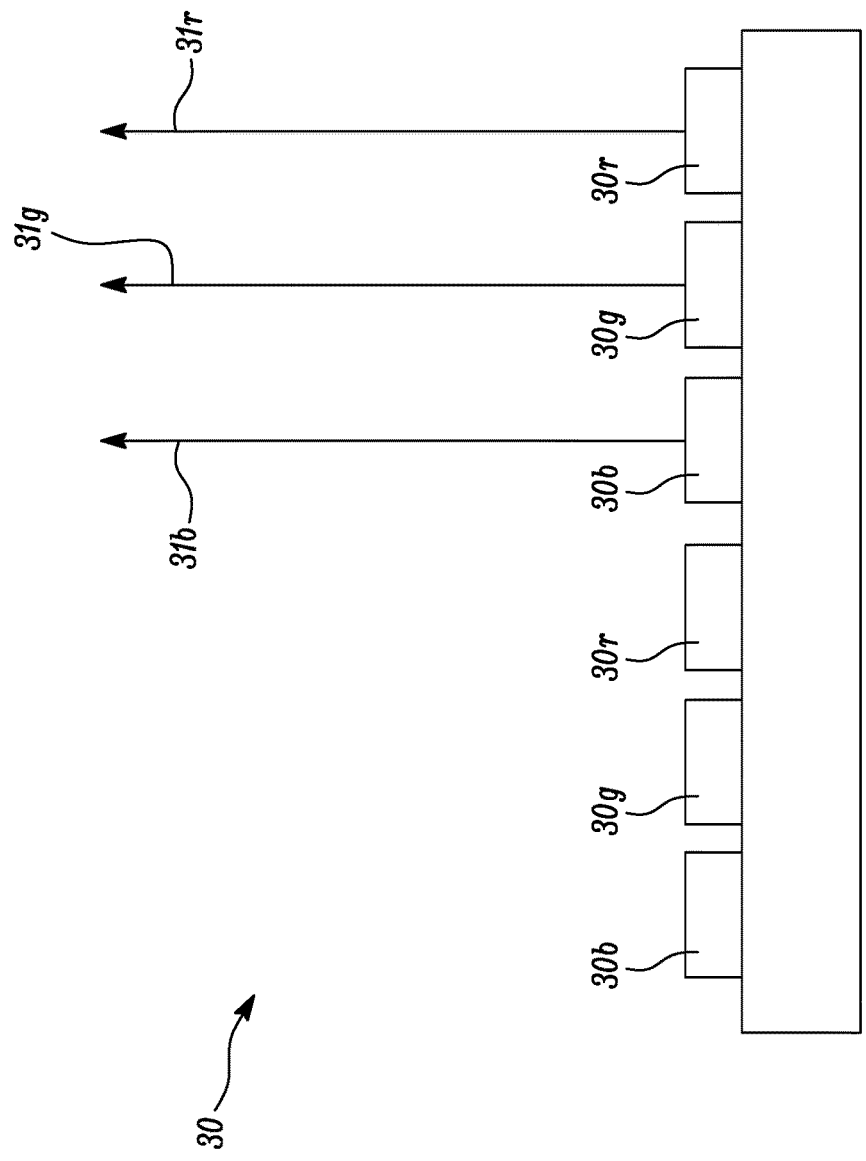
FIG. 4 is a schematic view of a display, according to an embodiment of the present disclosure.

FIG. 4 illustrates a schematic view of the display 30 according to an embodiment of the present disclosure. The display includes pluralities of blue, green, and red light emitting elements 30b, 30g, 30r. The display 30 is configured to emit the image light 31. Specifically, the pluralities of blue, green, and red light emitting elements 30b, 30g, 30r are configured to emit respective polarized blue, green, and red image lights 31b, 31g, 31r within respective blue, green, and red wavelength ranges 70b, 70g, 70r (shown in FIG. 8) extending from about 420 nm to about 480 nm, about 490 nm to about 560 nm, and about 590 nm to about 670 nm, respectively.

Figure 5A:
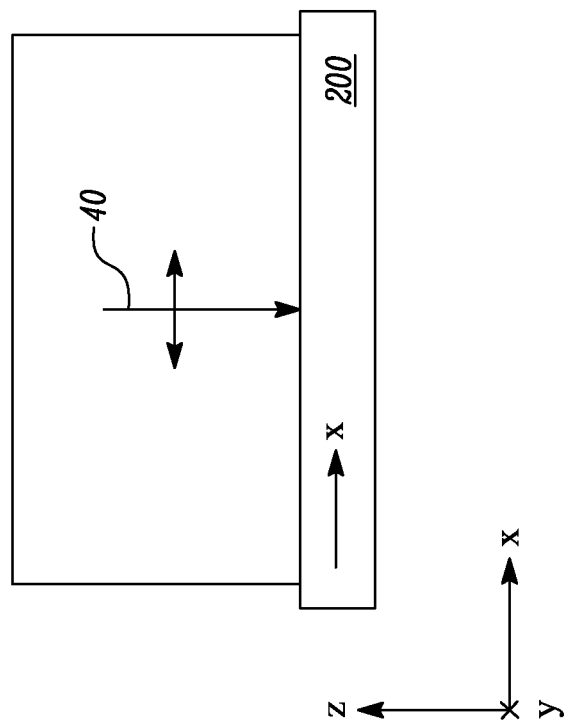
FIGS. 5A and 5B are schematic side views of the windshield with respective incident lights having different polarization states, according to an embodiment of the present disclosure.
Figure 5B:
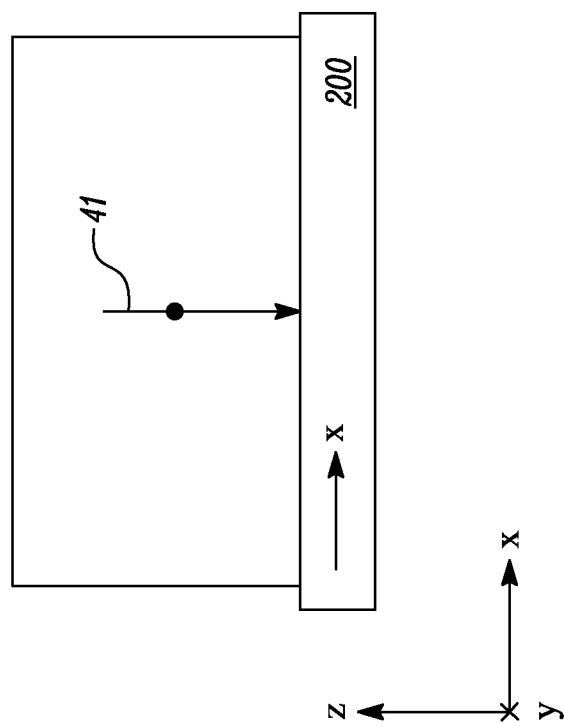

FIGS. 5A-5B illustrate schematic side views of the windshield 200 according to an embodiment of the present disclosure. Specifically, FIG. 5A illustrates a substantially normally incident light 40 polarized along a first direction and incident on the windshield 200, while FIG. 5B illustrates a substantially normally incident light 41 polarized along a second direction and incident on the windshield 200. In some embodiments, the first and second directions may be defined along the x- and y-axes, respectively.

Figure 6:
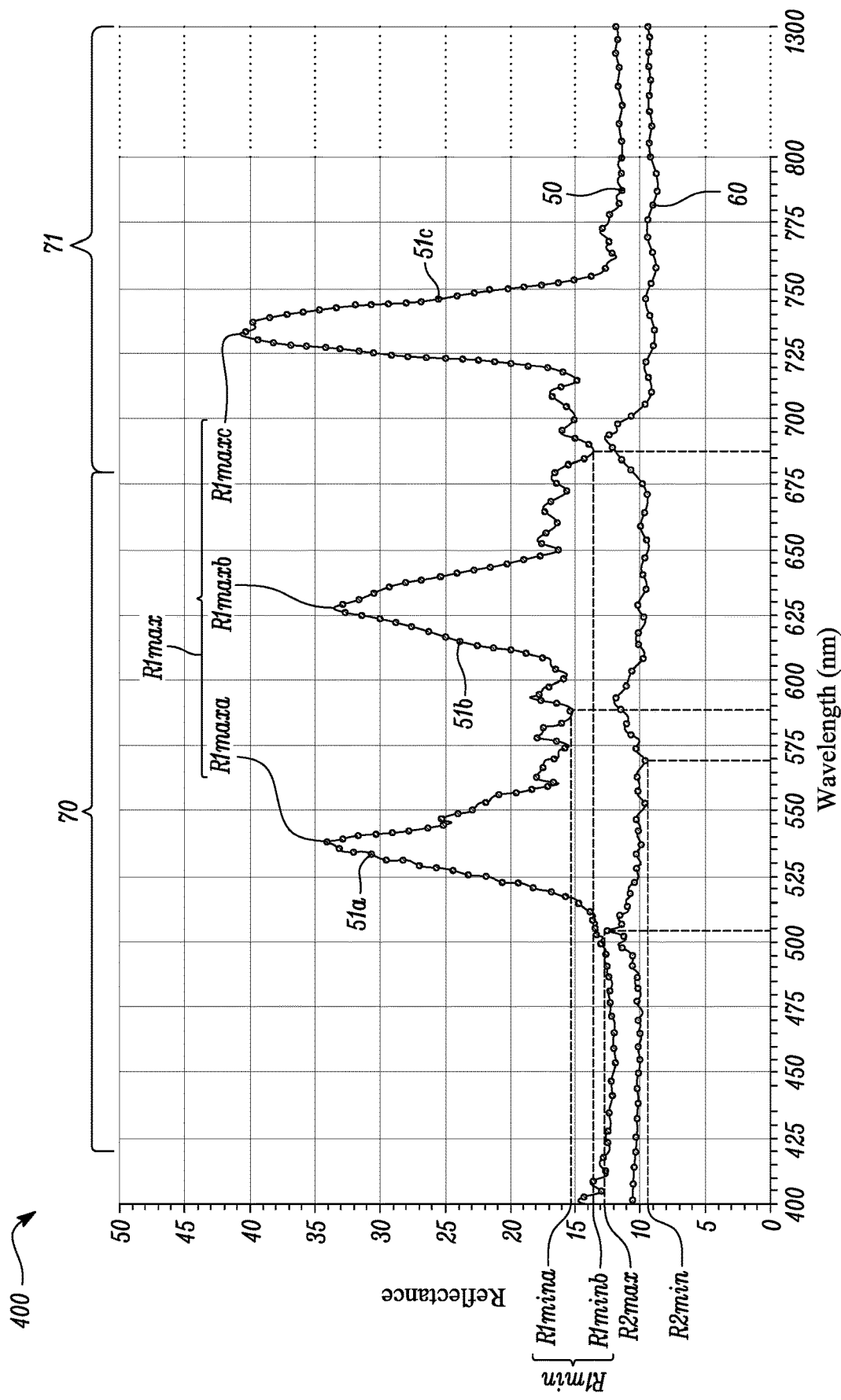
FIG. 6 is a graph illustrating optical reflectance versus wavelength for the windshield, according to an embodiment of the present disclosure.

FIG. 6 illustrates a graph 400 depicting optical reflectance versus wavelength of the windshield 200 (shown in FIG. 2) according to an embodiment of the present disclosure.

Specifically, the graph 400 depicts the optical reflectance versus wavelength of the windshield 200 including the reflective polarizer 20 for the incident lights 40, 41 (shown in FIGS. 5A and 5B) polarized along the respective first and second directions. Wavelength is expressed in nanometers (nm) in abscissa. The optical reflectance is expressed as a reflectance percentage in ordinate.

Referring to FIGS. 2, 5A, 5B, and 6, for the substantially normally incident lights 40, 41, the windshield 200 has first and second reflection spectra 50, 60 versus wavelength for the incident lights 40, 41 polarized along the respective first and second directions. Specifically, the windshield 200 has the first reflection spectrum 50 versus wavelength for the incident light 40 polarized along the first direction and the windshield 200 has the second reflection spectrum 60 versus wavelength for the incident light 41 polarized along the second direction.

In some embodiments, the incident light 40 polarized along the first direction may have a p-polarization state, while the incident light 41 polarized along the second direction may have an s-polarization state. In some other embodiments, the incident light 40 polarized along the first direction may have the s-polarization state, while the incident light 41 polarized along the second direction may have the p-polarization state. In the illustrated embodiment of FIG. 6, the incident light 40 polarized along the first direction has the p-polarization state, while the incident light 41 polarized along the second direction has the s-polarization state (i.e., when the first and second directions are defined along the x- and y-axes, respectively).

The first reflection spectrum 50 includes a plurality of substantially distinct and spaced apart reflection bands 51a, 51b, 51c. No more than two of the reflection bands 51a, 51b, 51c are disposed in a visible wavelength range 70 extending from about 420 nm to about 680 nm.

Further, at least one of the reflection bands 51a, 51b, 51c is disposed in an infrared wavelength range 71 extending from about 680 nm to about 1300 nm. For example, in the illustrated embodiment of FIG. 6, the reflection bands 51a, 51b are disposed in the visible wavelength range 70 and the reflection band 51c is disposed in the infrared wavelength range 71.

Therefore, the windshield 200 may have a low reflectivity for the substantially normally incident light 40 polarized along the first direction in the visible wavelength range 70.

Each of the reflection bands 51a, 51b, 51c has a maximum reflectance R1max between about 20% and about 80%. In some embodiments, each of the reflection bands 51a, 51b, 51c may have the maximum reflectance R1max between about 25% and about 70%, between about 25% and about 60%, between about 25% and about 50%, or between about 30% and about 50%.

In the illustrated embodiment of FIG. 6, the reflection band 51a has a maximum reflectance R1maxa of about 34%, the reflection band 51b has a maximum reflectance R1maxb of about 33%, and the reflection band 51c has a maximum reflectance R1maxc of about 41%.

Further, between each pair of adjacent reflection bands in the plurality of reflection bands 51a, 51b, 51c, the first reflection spectrum 50 has a minimum reflectance R1min between about 5% and about 25%. In some embodiments, between each pair of adjacent reflection bands in the plurality of reflection bands 51a, 51b, 51c, the first reflection spectrum 50 has the minimum reflectance R1min between about 7% and about 20% or between about 10% and about 20%.

Therefore, a difference between the maximum reflectance R1max and the minimum reflectance R1min may be low. This may prevent color shifts which may be otherwise caused due to a significant difference between the maximum reflectance R1max and the minimum reflectance R1min.

In the illustrated embodiment of FIG. 6, between the reflection bands 51a, 51b, the first reflection spectrum 50 has a minimum reflectance R1mina of about 15%. Further, between the reflection bands 51b, 51c, the first reflection spectrum 50 has a minimum reflectance R1minb of about 14%.

In the visible wavelength range 70, the second reflection spectrum 60 has a maximum reflectance R2max and a minimum reflectance R2min. The maximum reflectance R2max and the minimum reflectance R2min are within about 15% of each other. In some embodiments, the maximum reflectance R2max and the minimum reflectance R2min are within about 12%, within about 10%, within about 7%, within about 5%, or within about 4% of each other. This may further prevent the color shifts which may be otherwise caused due to a significant difference between the maximum reflectance R2max and the minimum reflectance R2min.

In the illustrated embodiment of FIG. 6, the maximum reflectance R2max has a value of about 12% and the minimum reflectance R2min has a value of about 9%. Therefore, the maximum reflectance R2max and the minimum reflectance R2min are within about 15% of each other. Specifically, in the illustrated embodiment of FIG. 6, the maximum reflectance R2max and the minimum reflectance R2min are within about 3% of each other.

Figure 7A:
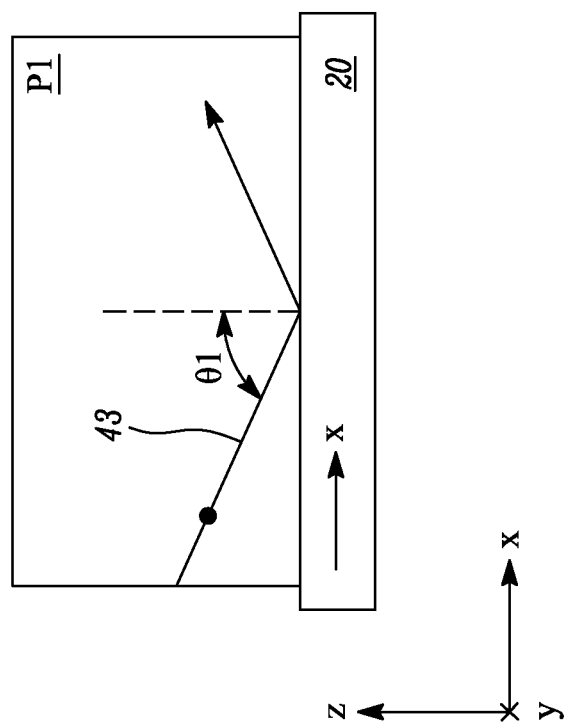
FIGS. 7A and 7B are schematic side views of the reflective polarizer with respective incident lights propagating in a first incident plane and having different polarization states, according to an embodiment of the present disclosure.
Figure 7B:
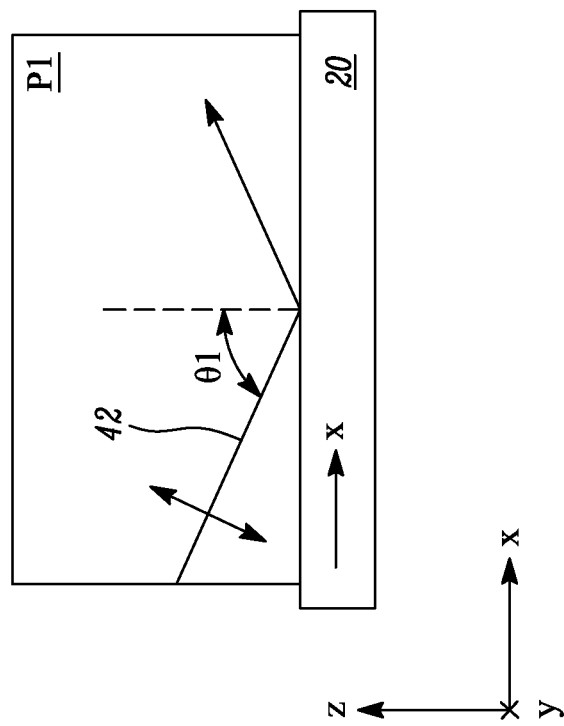

FIGS. 7A-7B illustrate schematic side views of the reflective polarizer 20 according to an embodiment of the present disclosure. Specifically, FIG. 7A illustrates a p-polarized incident light 42 that is propagating in a first incident plane P1 and incident on the reflective polarizer 20 at the first incident angle θ1. Further, FIG. 7B illustrates an s-polarized incident light 43 that is propagating in the first incident plane P1 and incident on the reflective polarizer 20 at the first incident angle θ1. In the illustrated example of FIGS. 7A and 7B, the first incident plane P1 is along a block axis (i.e., the x-axis) of the reflective polarizer 20. The first incident plane P1 corresponds to the x-z plane in FIGS. 7A and 7B.

Figure 8:
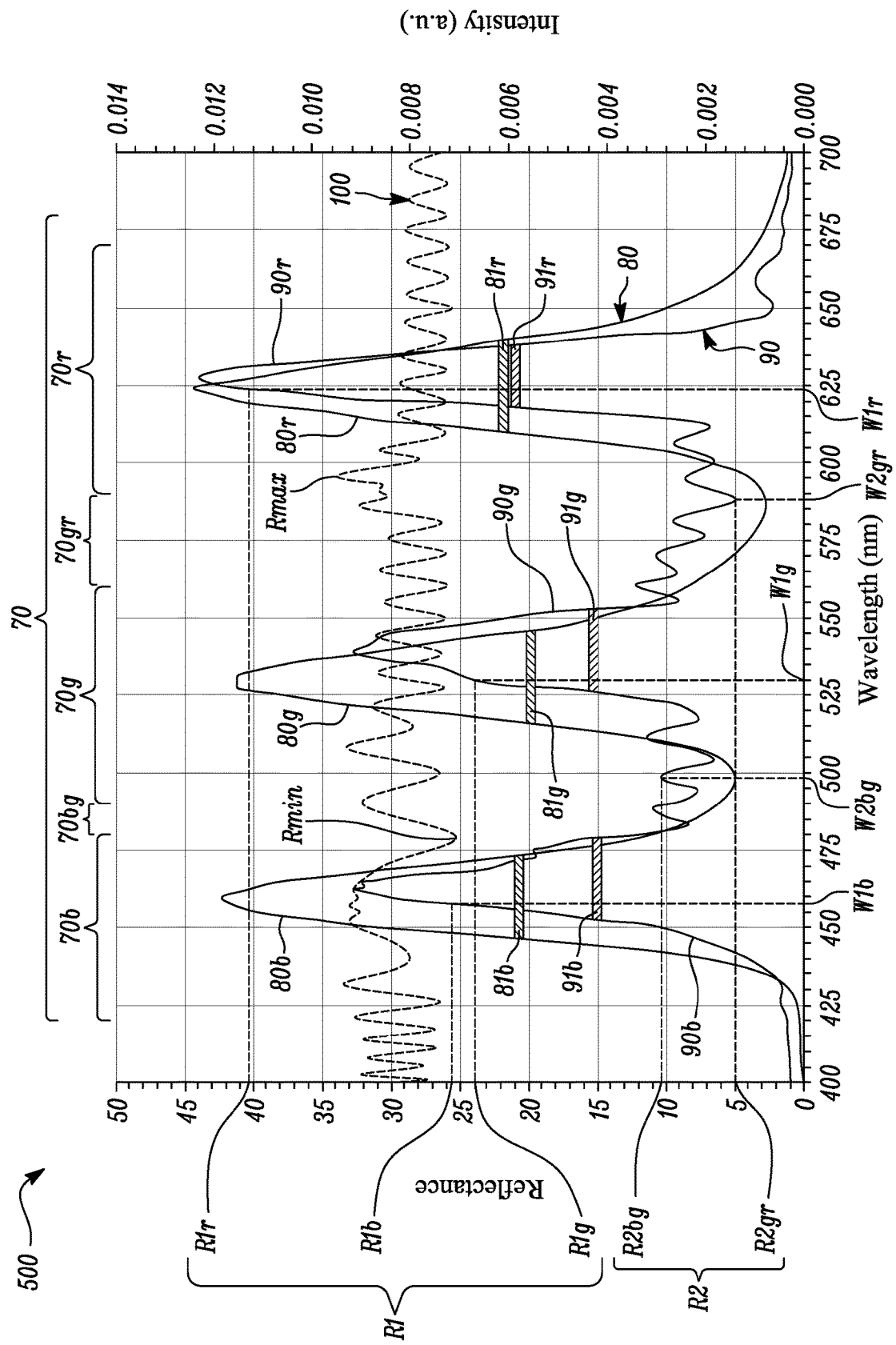
FIG. 8 is a graph illustrating optical reflectance versus wavelength of the reflective polarizer for the respective incident lights of FIGS. 7A and 7B propagating in the first incident plane, according to an embodiment of the present disclosure.

FIG. 8 illustrates a graph 500 depicting optical reflectance versus wavelength of the reflective polarizer 20 (shown in FIG. 2) according to an embodiment of the present disclosure. Specifically, the graph 500 depicts the optical reflectance versus wavelength of the reflective polarizer 20 for the p-polarized and s-polarized incident lights 42, 43 that are propagating in the first incident plane P1 (shown in FIGS. 7A and 7B) and incident on the reflective polarizer 20 at the first incident angle θ1 (shown in FIGS. 7A and 7B). The graph 500 further depicts emission intensity versus wavelength of the display 30 (shown in FIG. 2). Wavelength is expressed in nanometers (nm) in abscissa. The optical reflectance is expressed as a reflectance percentage in the left ordinate, while the emission intensity is expressed in arbitrary units (a.u.) in the right ordinate. The emission intensity in arbitrary units corresponds to an emission spectrum 80 of the display 30 (shown in FIG. 4). In the illustrated example of FIG. 8, the first incident angle θ1 is about 55 degrees.

As discussed above, the display 30 is configured to emit the image light 31 (shown in FIG. 2). The image light 31 has substantially distinct blue, green, and red emission bands 80b, 80g, 80r having respective blue, green, and red full width at half maxima (FWHMs) 81b, 81g, 81r. Specifically, the emission spectrum 80 of the display 30 includes the substantially distinct blue, green, and red emission bands 80b, 80g, 80r having the respective blue, green, and red FWHMs 81b, 81g, 81r.

Referring to FIGS. 2, 7A, 7B, and 8, for the p-polarized incident light 42 propagating in the first incident plane P1 and incident on the reflective polarizer 20 at the first incident angle θ1, an optical reflectance 90 of the reflective polarizer 20 versus wavelength includes substantially distinct blue, green, and red reflection bands 90b, 90g, 90r having respective blue, green, and red FWHMs 91b, 91g, 91r. Therefore, the reflective polarizer 20 is a notched reflective polarizer having multiple notches or bands.

In the illustrated embodiment of FIG. 8, the blue FWHM 91b of the blue reflection band 90b overlaps at least 50% of the blue FWHM 81b of the blue emission band 80b, the green FWHM 91g of the green reflection band 90g overlaps at least 50% of the green FWHM 81g of the green emission band 80g, and the red FWHM 91r of the red reflection band 90r overlaps at least 50% of the red FWHM 81r of the red emission band 80r.

The reflective polarizer 20 reflects R1% of the incident light 42 for at least one same blue wavelength W1b within the blue FWHMs 81b, 91b of the blue emission and reflection bands 80b, 90b, at least one same green wavelength W1g within the green FWHMs 81g, 91g of the green emission and reflection bands 80g, 90g, and at least one same red wavelength W1r within the red FWHMs 81r, 91r of the red emission and reflection bands 80r, 90r.

Specifically, the reflective polarizer 20 reflects R1b % of the incident light 42 for the at least one same blue wavelength W1b within the blue FWHMs 81b, 91b of the blue emission and reflection bands 80b, 90b. Further, the reflective polarizer 20 reflects R1g % of the incident light 42 for the at least one same green wavelength W1g within the green FWHMs 81g, 91g of the green emission and reflection bands 80g, 90g. Further, the reflective polarizer 20 reflects R1r % of the incident light 42 for the at least one same red wavelength W1r within the red FWHMs 81r, 91r of the red emission and reflection bands 80r, 90r.

R1 is greater than or equal to 10% and less than or equal to 70% (i.e., 10%≤R1≤70%). Specifically, each of R1b, R1g, R1r is greater than or equal to 10% and less than or equal to 70%. In some embodiments, R1 is greater than or equal to 15% and less than or equal to 65%, greater than or equal to 15% and less than or equal to 55%, greater than or equal to 10% and less than or equal to 55%, or greater than or equal to 20% and less than or equal to 50%.

The reflective polarizer 20 reflects R2% of the incident light 42 for at least one same first wavelength W2bg between the FWHMs 91b, 91g of the blue and green reflection bands 90b, 90g and between the FWHMs 81b, 81g of the blue and green emission bands 80b, 80g, and for at least one same second wavelength W2gr between the FWHMs 91g, 91r of the green and red reflection bands 90g, 90r and between the FWHMs 81g, 81r of the green and red emission bands 80g, 80r.

Specifically, the reflective polarizer 20 reflects R2bg % of the incident light 42 for the at least one same first wavelength W2bg between the FWHMs 91b, 91g of the blue and green reflection bands 90b, 90g and between the FWHMs 81b, 81g of the blue and green emission bands 80b, 80g. Further, the reflective polarizer 20 reflects R2gr % of the incident light 42 for the at least one same second wavelength W2gr between the FWHMs 91g, 91r of the green and red reflection bands 90g, 90r and between the FWHMs 81g, 81r of the green and red emission bands 80g, 80r.

R2 is greater than or equal to 2 and less than or equal to R1/2 (i.e., 2≤R2≤R1/2). Specifically, each of R2bg, R2gr is greater than or equal to 2 and less than or equal to R1/2. In some embodiments, R2 is greater than or equal to 3 and less than or equal to R1/2.5 or greater than or equal to 3 and less than or equal to R1/3. Therefore, the reflective polarizer 20 may have a low optical reflectance as compared to conventional reflective polarizers. Therefore, a difference between R1 and R2 may be a low. This may prevent color shifts which may be otherwise caused due to a significant difference between R1 and R2.

For the s-polarized incident light 43 propagating in the first incident plane P1 and incident on the reflective polarizer 20 at the first incident angle θ1, and for the visible wavelength range 70, an optical reflectance 100 of the reflective polarizer 20 versus wavelength has a maximum reflectance Rmax and a minimum reflectance Rmin. Rmax and Rmin are within about 25% of each other. In some embodiments, Rmax and Rmin are within about 20% or within about 15% of each other. This may further prevent the color shifts which may be otherwise caused due to a significant difference between Rmax and Rmin.

The reflective polarizer 20 is configured to receive the emitted polarized blue, green and red image lights 31b, 31g, 31r (shown in FIG. 4) and reflect between about 10% and about 80% of the received image lights 31b, 31g, 31r toward the viewer 11 (shown in FIG. 2). In some embodiments, the reflective polarizer 20 may be configured to receive the emitted polarized blue, green, and red image lights 31b, 31g, 31r and reflect between about 10% and about 75%, between about 15% and about 75%, between about 15% and about 70%, between about 20% and about 70%, between about 20% and about 65%, between about 20% and about 60%, between about 20% and about 55%, or between about 20% and about 50% of the received image lights 31b, 31g, 31r toward the viewer 11.

Further, for each of a blue-green wavelength range 70bg disposed between the blue and green wavelength ranges 70b, 70g and a green-red wavelength range 70gr disposed between the green and red wavelength ranges 70g, 70r, the reflective polarizer 20 has an average optical reflectance of between about 2% and about 20%. In some embodiments, the average optical reflectance is between about 3% and about 15%, between about 4% and about 15%, or about 5% and about 15%.

Since the reflective polarizer 20 is configured to reflect between about 10% and about 80% of the received image lights 31b, 31g, 31r toward the viewer 11 and has the average optical reflectance of between about 2% and about 20% for each of the blue-green wavelength range 70bg disposed between the blue and green wavelength ranges 70b, 70g and the green-red wavelength range 70gr disposed between the green and red wavelength ranges 70g, 70r, the variation in the optical reflectivity of the reflective polarizer 20 in the visible wavelength range 70 may be low. This may prevent the color shifts which may be otherwise caused due to a significant variation in the optical reflectivity of the reflective polarizer 20 in the visible wavelength range 70.

Figure 9A:
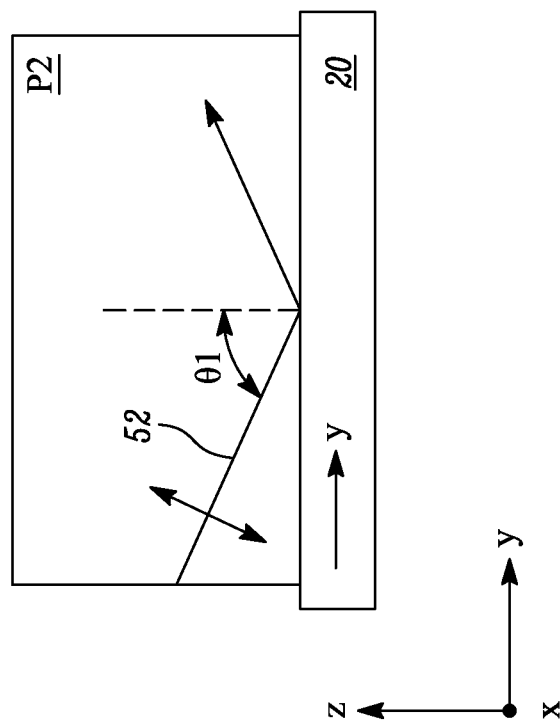
FIGS. 9A and 9B are schematic side views of the reflective polarizer with an incident light propagating in a second incident plane and having respective polarization states, according to an embodiment of the present disclosure.
Figure 9B:
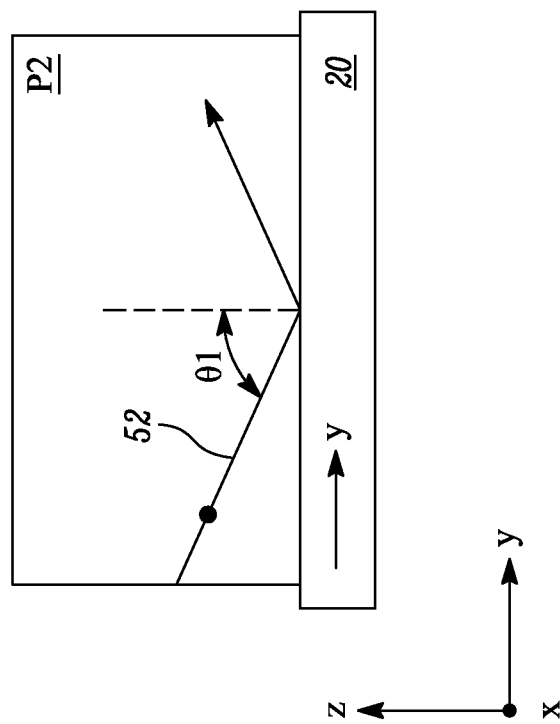

FIGS. 9A-9B illustrate schematic side views of the reflective polarizer 20 according to an embodiment of the present disclosure. Specifically, FIG. 9A illustrates an incident light 52 (e.g., the image light 31) that is propagating in a second incident plane P2 and incident on the reflective polarizer 20 at the incident angle θ1. Further, FIG. 9B illustrates the incident light 52 that is propagating in the second incident plane P2 and incident on the reflective polarizer 20 at the incident angle θ1.

In the illustrated example of FIGS. 9A and 9B, the second incident plane P2 is along a pass axis (i.e., the y-axis) of the reflective polarizer 20. The second incident plane P2 corresponds to the y-z plane in FIGS. 9A and 9B. Furthermore, in the illustrated embodiment of FIG. 9A, the incident light 52 is a p-polarized incident light and in the illustrated embodiment of FIG. 9B, the incident light 52 is an s-polarized incident light.

Figure 10:
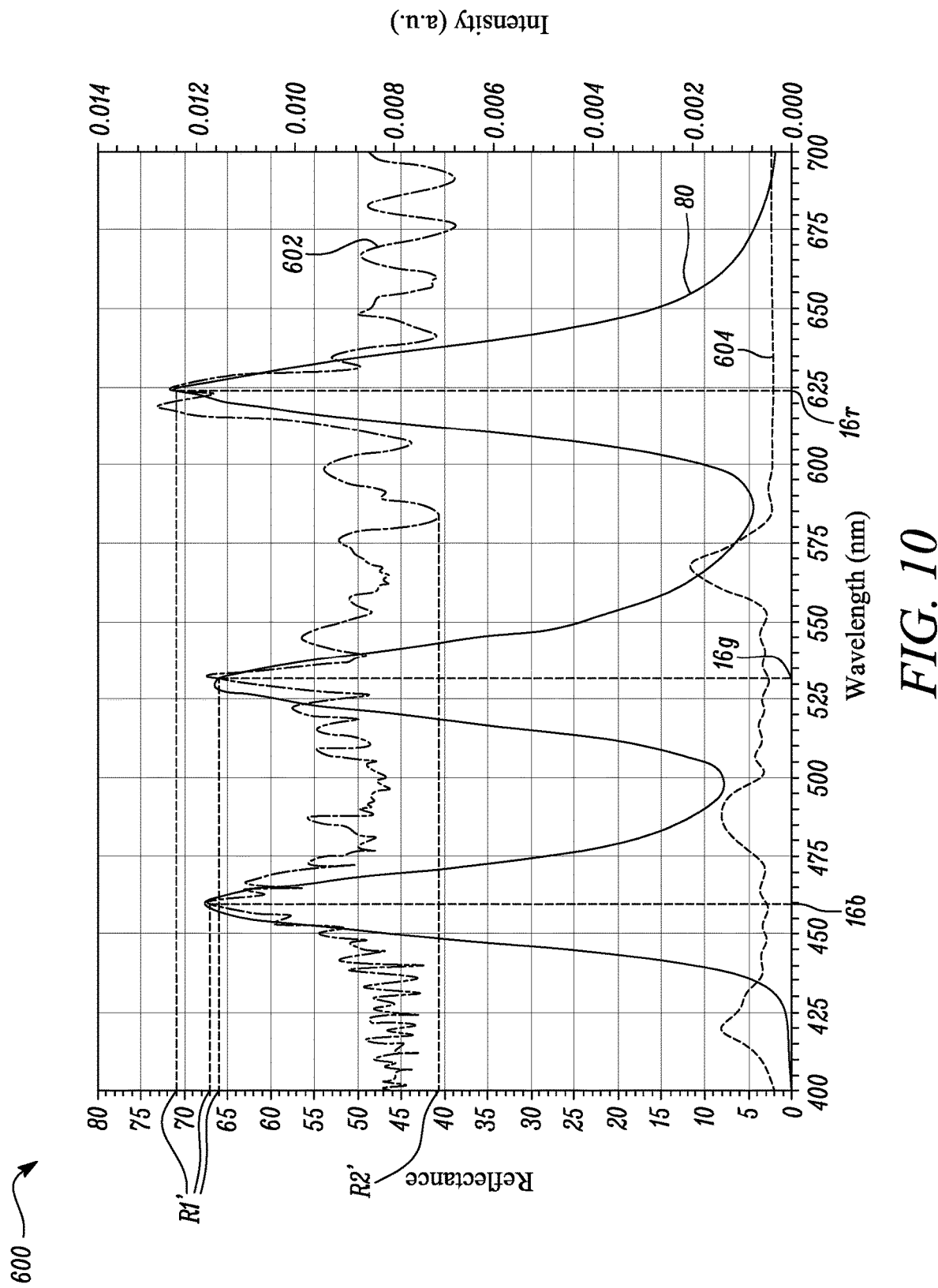
FIG. 10 is a graph illustrating optical reflectance versus wavelength of the reflective polarizer for the incident light of FIGS. 9A and 9B propagating in the second incident plane having the respective polarization states, according to an embodiment of the present disclosure.

FIG. 10 illustrates a graph 600 of optical reflectance versus the wavelength of the reflective polarizer 20 (Shown in FIG. 2) according to an embodiment of the present disclosure. Specifically, the graph 600 of the optical reflectance versus the wavelength of the reflective polarizer 20 for the incident light 52 that is propagating in the second incident plane P2 shown in FIGS. 9A and 9B and incident on the reflective polarizer 20 at the first incident angle θ1. The graph 600 further depicts emission intensity versus wavelength of the display 30 (shown in FIG. 2). Wavelength is expressed in nanometers (nm) in abscissa. The optical reflectance is expressed as a reflectance percentage in the left ordinate, while the emission intensity is expressed in arbitrary unit (a.u.) in the right ordinate. The emission intensity in arbitrary units corresponds to the emission spectrum 80 of the display 30 (shown in FIG. 4). In the illustrated example of FIG. 10, the first incident angle θ1 is about 65 degrees.

The graph 600 includes a curve 602 depicting an optical reflectance of the reflective polarizer 20 (shown in FIG. 2) for the s-polarization state of the incident light 52 (shown in FIG. 9B) incident on the reflective polarizer 20 at the incident angle θ1. The graph 600 further includes a curve 604 depicting the optical reflectance of the reflective polarizer 20 for the p-polarization state of the incident light 52 (shown in FIG. 9A) incident on the reflective polarizer 20 at the incident angle θ1.

Referring to FIGS. 2, 9A, 9B, and 10, for the incident light 52 incident at the incident angle θ1 of greater than about 30 degrees, and for one of the p- and s-polarization states, the reflective polarizer 20 has an optical reflectance R1' for each of a blue wavelength 16b between about 420 nm to about 480 nm, a green wavelength 16g between about 490 nm to about 560 nm, and a red wavelength 16r between about 590 nm to about 670 nm.

In the illustrated embodiment of FIG. 10, for the incident light 52 incident at the incident angle θ1 of about 65 degrees, and for the s-polarization state, the reflective polarizer 20 has the optical reflectance R1' for each of the blue wavelength 16b, the green wavelength 16g, and the red wavelength 16r. The optical reflectance R1' for each of the blue, green, and red wavelengths 16b, 16g, 16r is between about 66% and about 71%.

Further, for the incident light 52 incident at the incident angle θ1 of greater than about 30 degrees, and for one of the p- and s-polarization states, the reflective polarizer 20 has a minimum optical reflectance R2' for wavelengths between the blue and green wavelengths 16b, 16g and between the green and red wavelengths 16g, 16r.

In the illustrated embodiment of FIG. 10, for the incident light 52 incident at the incident angle θ1 of about 65 degrees, and for the s-polarization state, the reflective polarizer 20 has the minimum optical reflectance R2' for wavelengths between the blue and green wavelengths 16b, 16g and between the green and red wavelengths 16g, 16r. The minimum optical reflectance R2' is about 41%.

A ratio of the optical reflectance R1' to the minimum optical reflectance R2' is greater than or equal to about 1.1 and less than or equal to about 5 (i.e., 1.1≤R1'/R2'≤5). In some embodiments, the ratio of the optical reflectance R1' to the minimum optical reflectance R2' is greater than or equal to about 1.2 and less than or equal to about 4 or greater than or equal to about 1.3 and less than or equal to about 3. In the illustrated embodiment of FIG. 10, the ratio is between about 1.61 and about 1.73.

Further, for the other of the p- and s-polarization states, the reflective polarizer 20 has an average optical reflectance of less than about 20% in the visible wavelength range 70. In some embodiments, for the other of the p- and s-polarization states, the reflective polarizer 20 has the average optical reflectance of less than about 15%, less than about 10%, or less than about 5% in the visible wavelength range 70.

In the illustrated embodiment of FIG. 10, for the p-polarization state, the reflective polarizer 20 has the average optical reflectance of less than about 20% in the visible wavelength range 70.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A windshield of a vehicle comprising a reflective polarizer and configured to receive and reflect an image light emitted by a display toward a passenger of the vehicle, such that for a substantially normally incident light, the windshield has first and second reflection spectra versus wavelength for the incident light polarized along respective first and second directions, the first reflection spectrum comprising a plurality of substantially distinct and spaced apart reflection bands, no more than two of the reflection bands disposed in a visible wavelength range extending from about 420 nm to about 680 nm, at least one of the reflection bands disposed in an infrared wavelength range extending from about 680 nm to about 1300 nm, each of the reflection bands having a maximum reflectance R1max between about 20% and about 80%, wherein between each pair of adjacent reflection bands in the plurality of reflection bands, the first reflection spectrum has a minimum reflectance R1min between about 5% and about 25%, and wherein in the visible wavelength range, the second reflection spectrum has a maximum reflectance R2max and a minimum reflectance R2min, R2max and R2min within about 15% of each other.

2. The windshield of the vehicle of claim 1, wherein the reflective polarizer is disposed between first and second glass layers.

3. The windshield of the vehicle of claim 1, wherein the reflective polarizer is bonded to each of the first and second glass layers via a bonding layer.

4. A display system for displaying a polarized image to a viewer, the display system comprising:
 a display comprising pluralities of blue, green, and red light emitting elements configured to emit respective polarized blue, green, and red image lights within respective blue, green, and red wavelength ranges extending from about 420 nm to about 480 nm, about 490 nm to about 560 nm, and about 590 nm to about 670 nm, respectively; and
 a reflective polarizer configured to receive the emitted polarized blue, green, and red image lights and reflect between about 10% and about 80% of the received image lights toward the viewer, wherein for each of a blue-green wavelength range disposed between blue and green wavelength ranges and a green-red wavelength range disposed between the green and red wavelength ranges, the reflective polarizer has an average optical reflectance of between about 2% and about 20%.

5. A reflective polarizer comprising a plurality of polymeric layers numbering at least 10 in total, each of the polymeric layers having an average thickness of less than about 500 nm, such that for an incident light incident at an incident angle of greater than about 30 degrees, and for one of p- and s-polarization states, the reflective polarizer has an optical reflectance R1' for each of a blue wavelength between about 420 nm to about 480 nm, a green wavelength between about 490 nm to about 560 nm, and a red wavelength between about 590 nm to about 670 nm, and a minimum optical reflectance R2' for wavelengths between the blue and green wavelengths and between the green and red wavelengths, 1.1≤R1'/R2'≤5;
 wherein, for the other of the p- and s-polarization states, the reflective polarizer has an average optical reflectance of less than about 20% in a visible wavelength range extending from about 420 nm to about 680 nm.

6. The reflective polarizer of claim 5 further comprising at least one skin layer having an average thickness of greater than about 500 nm.

* * * * *